(12) United States Patent
Firmin

(10) Patent No.: US 10,025,391 B2
(45) Date of Patent: Jul. 17, 2018

(54) ERGONOMIC KEYBOARD

(71) Applicant: Reuben Firmin, Accokeek, MD (US)

(72) Inventor: Reuben Firmin, Accokeek, MD (US)

( * ) Notice: Subject to any disclaimer, the term of this patent is extended or adjusted under 35 U.S.C. 154(b) by 21 days.

(21) Appl. No.: 15/393,466

(22) Filed: Dec. 29, 2016

(65) Prior Publication Data

US 2017/0185163 A1 Jun. 29, 2017

Related U.S. Application Data

(60) Provisional application No. 62/272,365, filed on Dec. 29, 2015.

(51) Int. Cl.
*G06F 3/02* (2006.01)
*G06F 3/16* (2006.01)

(52) U.S. Cl.
CPC .......... *G06F 3/0216* (2013.01); *G06F 3/0208* (2013.01); *G06F 3/0213* (2013.01); *G06F 3/165* (2013.01)

(58) Field of Classification Search
CPC ........ G06F 3/02; G06F 3/0202; G06F 3/0208; G06F 3/0216; G06F 1/16; G06F 1/1662; G06F 1/1664; G06F 1/1667; B41J 5/10; B41J 5/102
See application file for complete search history.

(56) References Cited

U.S. PATENT DOCUMENTS

| | | | | |
|---|---|---|---|---|
| 4,509,873 A | * | 4/1985 | Ryan | B41J 5/10 341/22 |
| 4,769,516 A | * | 9/1988 | Allen | B41J 5/28 200/5 A |
| 5,302,040 A | | 4/1994 | Louis | |
| D381,016 S | * | 7/1997 | Paull | D14/461 |
| 5,788,386 A | | 8/1998 | Hayashi et al. | |
| 6,005,496 A | | 12/1999 | Hargreaves et al. | |
| 6,224,279 B1 | * | 5/2001 | Nielsen | H01H 13/84 200/345 |
| 6,677,927 B1 | * | 1/2004 | Bruck | G06F 1/1664 345/156 |
| 6,725,318 B1 | * | 4/2004 | Sherman | G06F 3/0202 710/2 |
| 6,950,038 B2 | * | 9/2005 | Hsu | G06F 3/0221 341/20 |
| D546,831 S | * | 7/2007 | O'Neil | D14/455 |
| 7,520,689 B2 | * | 4/2009 | Lane | A47B 21/0371 248/118 |
| D626,127 S | * | 10/2010 | Odell | D14/392 |

(Continued)

*Primary Examiner* — Joe H Cheng

(57) ABSTRACT

A keyboard with keys arranged in at least three distinct sections, left, right, and supplementary. The left and right sections include left and right sets of keys, respectively, that contain letters and other commonly used keys. The left and right sections are arranged at between 20 and 30 degrees relative to a perpendicular to the user direction, and between −20 and −30 degrees relative to the perpendicular, respectively. The keys in the left and right sections are arranged in non-staggered columns, and the supplementary section containing supplementary keys arranged at between −5 and −15 degrees relative to the perpendicular, with keys arranged in non-staggered columns. The keyboard having a substantially uniform total height that does not exceed 1 centimeter, and which is arranged to sit flat on a surface.

20 Claims, 9 Drawing Sheets

Plan View of an Ergonomic Keyboard

Side View of an Ergonomic Keyboard

(56) References Cited

U.S. PATENT DOCUMENTS

| | | |
|---|---|---|
| 8,226,308 B1 | 7/2012 | Borg |
| 8,599,152 B1 * | 12/2013 | Wurtenberger ..... G06F 3/04895 345/168 |
| 9,335,794 B2 | 5/2016 | Dickenson et al. |
| 9,501,156 B2 | 11/2016 | Linegar et al. |
| 2003/0035677 A1 | 2/2003 | Camacho et al. |
| 2003/0043123 A1 * | 3/2003 | Hinckley ................ G06F 3/021 345/173 |
| 2006/0275069 A1 | 12/2006 | Jones et al. |
| 2014/0199107 A1 | 7/2014 | Jorge |
| 2016/0139681 A1 | 5/2016 | Linegar et al. |

\* cited by examiner

FIG. 1 - Plan View of an Ergonomic Keyboard

FIG. 2 - Front View of an Ergonomic Keyboard

FIG. 3 - Side View of an Ergonomic Keyboard

FIG. 4 - Perspective View of an Ergonomic Keyboard

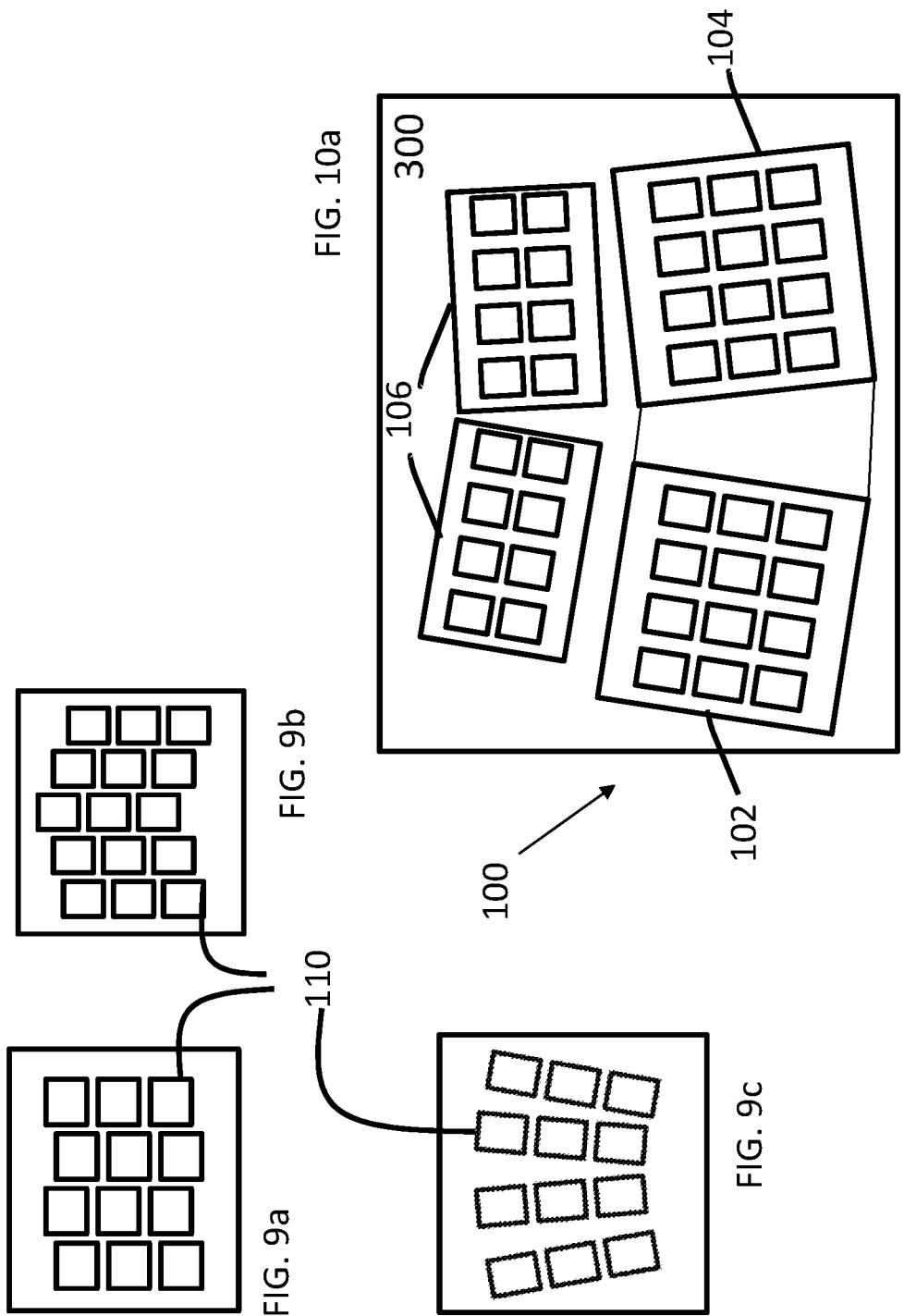

ERGONOMIC KEYBOARD

CROSS-REFERENCE TO RELATED APPLICATIONS

This non-provisional patent application claims priority to U.S. Provisional Patent Application No. 62/272,365, entitled "Ergonomic Computer Input Device" filed Dec. 29, 2015, which is incorporated herein in its entirety.

BACKGROUND OF THE INVENTION

Field of the Invention

The present disclosure relates in general to input devices, and more specifically to keyboards, systems, and methods for inputting and manipulating information, such as electronic devices including computers, etc., which is designed in such a manner as to improve or optimize the ergonomics for a human user.

Background Art

Some known standard computer keyboards have a layout derived from typewriters. As such, the layout of such known keyboards is based on decisions that had more to do with the mechanics of the original devices, rather than a deliberate human centric design. Repetitive Strain Injury and Ulnar Nerve Injury are commonly attributed to the poor ergonomics of standard keyboards, due to the unnatural angle at which a user's wrists must be positioned to interact with them.

Some known devices and methods for improving the ergonomics of keyboards include embodiments that improve the lateral angle at which the wrists meet the keyboard by separating the keyboard into two primary sections, and angling each section at between 10-14 degrees from perpendicular. Such keyboards, however, also typically require a user's wrists to be extended (angled upwards), which research indicates to be detrimental. Further, they maintain the staggered row layout first found in typewriters. Finally, they commonly include a supplementary key section, which is angled at perpendicular (0 degrees), which requires lateral ulnar deviation to use from the resting position of the right wrist.

Thus, a need exists for improved devices to better meet the needs of users of computer keyboards.

BRIEF SUMMARY OF THE INVENTION

Keyboards of the present invention have keys arranged in at least three distinct sections and at non-zero angle relative to the other sections. The keyboard may have a substantially uniform total height that may not exceed 1 centimeter in some embodiments. In such embodiments, the first and second section can contain and/or include the most commonly used keys, arranged at between 20 and 30 degrees relative to a perpendicular to a user axis, and between −20 and −30 degrees relative to perpendicular, with keys arranged in non-staggered (aligned) columns, and the third section containing supplementary keys arranged at between −5 and −15 degrees relative to perpendicular, with keys arranged in non-staggered columns.

BRIEF DESCRIPTION OF THE DRAWINGS

FIGS. 9*a-c* shows exemplary key arrangements.

DETAILED DESCRIPTION OF THE INVENTION

As used herein the term "key" refers to a button electrically connected to a keyboard circuit board by, for example, a switch or membrane, which, when pressed, results in a particular electronic signal being transmitted by, for example, a wire or wireless (e.g., radio) link to a device, which may be part of a system and may be connected to one or more other devices. In some embodiments, a key can also refer to a virtual representation of a physical button or key.

As used herein the term "Shift" refers to a key which, when pressed in combination with other keys, results in a common alternate key signal being transmitted, generally either a symbol or capitalization of a letter. Thus, the key referred to herein may be configured to send alternate signals from those referred to, when pressed in combination with the Shift key.

Keys are referred to herein as representing the symbols defined in the common American National Standards Institute (ANSI) key standard (ANSI-INCITS 154-1988), with some common and widely used extensions. In other embodiments, keys can represent any suitable symbols. For example, keys can represent a symbol from any other suitable standard and/or non-standard specification.

Figure 1:
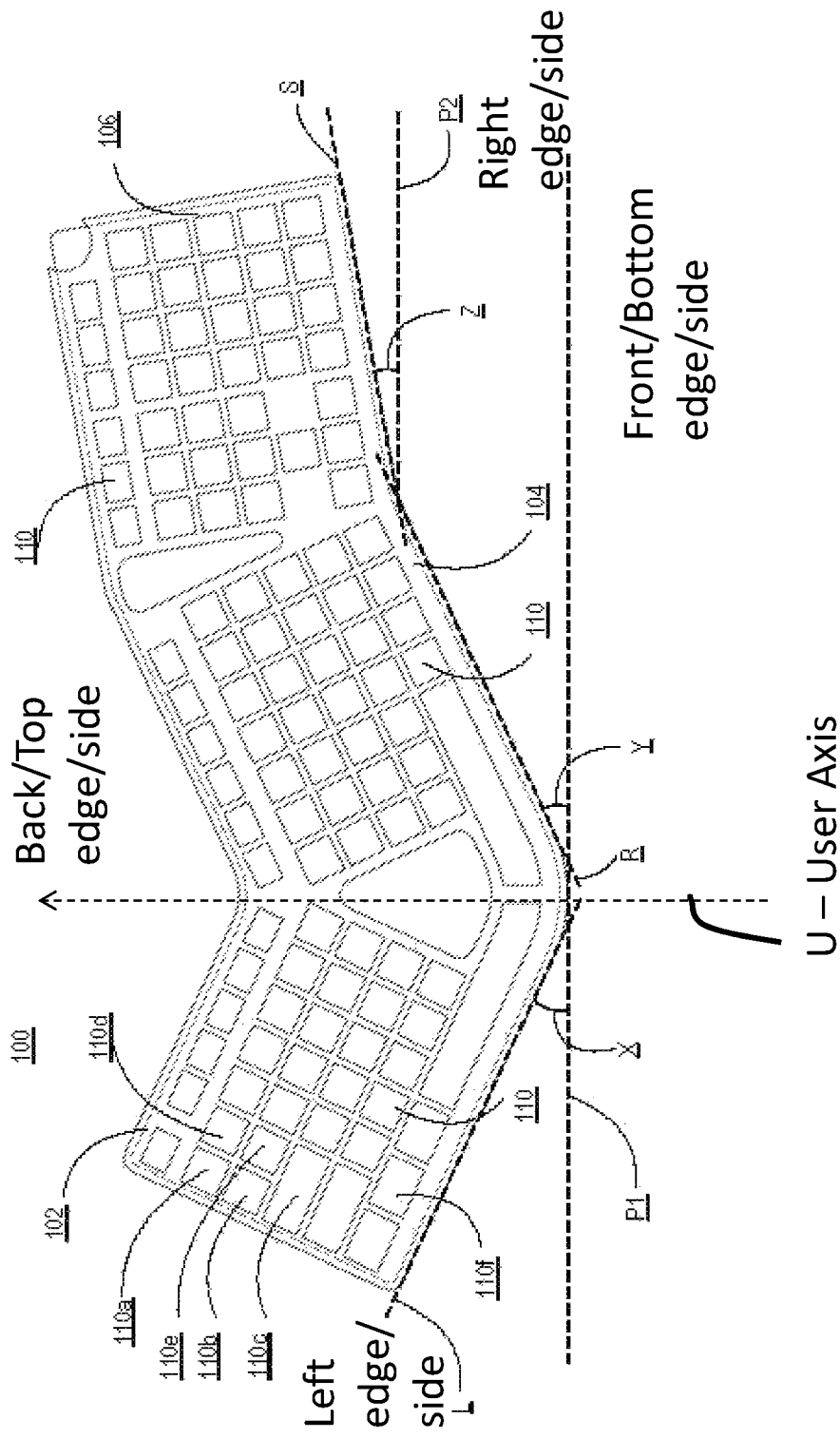
FIG. 1 shows a plan view of ergonomic keyboard embodiments.

FIG. 1 illustrates an ergonomic keyboard 100 according to an embodiment. The ergonomic keyboard 100 can be arranged in three sections, as shown in FIG. 1, a left section 102, a right section 104, and a supplementary section 106. Left and right being relative to a user position or axis U, as shown in FIG. 1. One of skill in the art will appreciate that keyboards of the present invention may also include additional keyboard components that are not included in these three sections. For example, power, media, communications, etc., as well as a mouse pad.

The left section 102 includes a left set of keys including one or more keys including a first group of writing character keys and can also include number and various keyboard function keys. The writing character keys generally include characters that are used to write one or more languages; for example, alphabet or letter, syllable, word keys, etc., but generally exclude number and various keyboard function keys. The right section 104 includes a right set of keys including one or more keys including a second group of writing character keys and can also include number and various keyboard function keys. For example, the letter keys on a QWERTY layout can be divided between the first and second groups of letter keys. The supplementary section 106 includes a supplementary set of keys including one or more keys.

In an embodiment, the left section 102 of an ergonomic keyboard 100 includes keys (generally referred to as 110 in FIG. 1) generally organized in non-staggered columns. For example, key 110a is aligned along an axis in a column with key 110b. Similarly stated, a first edge of key 110a defines a substantially straight and/or linear axis with a first edge of key 110b. In some instances, a second edge of key 110a, which is substantially parallel to the first edge of key 110a, can also define a substantially straight and/or linear axis with a second edge of key 110b, which is substantially parallel to the first edge of key 110b. Accordingly, key 110a can be said to be aligned parallel to key 110b along an axis.

In other instances, a non-staggered column can also include keys aligned with only a single edge of another key and/or keys that span more than a single column and/or row. For example, key 110c is aligned with a single edge of key 110b and a single edge of key 110e. Key 110c can be said to span two columns (i.e., the column including key 110b and the column including key 110e).

Additionally, keys 110 can be organized in non-staggered rows. For example, key 110a is aligned along an axis in a row with key 110d. Similarly stated, a third edge of key 110a defines a substantially straight and/or linear axis with a first edge of key 110d. Accordingly, key 110a can be said to be aligned parallel to key 110d along an axis. In some instances, a fourth edge of key 110a, which is substantially parallel to the third edge of key 110a, can also define a substantially straight and/or linear axis with a second edge of key 110d, which is substantially parallel to the first edge of key 110d. In other instances, a non-staggered row can also include one or more keys aligned with only a single edge of another key.

In some embodiments, the keyboard can also include one or more offset keys (in rows and/or columns). For example, while a key (e.g., key 110f) can be aligned with other keys within a row, the key (e.g., key 110f) can be not aligned in a column with another key. More specifically, while the two substantially parallel edges of the key (e.g., key 110f) associated with its position within a row are substantially aligned with the edges of the other keys within the row, the two substantially parallel edges of the key (e.g., key 110f) associated with its position in a column are not aligned with other keys in a column. In other embodiments, the left, right, and supplementary sections may include both staggered and non-staggered keys.

The left section 102 can be angled at a first angle of between about 20 and about 30 degrees from perpendicular, which is an angle that limits lateral bending of the left wrist for an average user. For example, the first angle can be a positive angle X in FIG. 1 defined by the intersection of a perpendicular axis P1 and an axis L defined by an edge of the left section 102 of the keyboard 100 can be between about 20 and about 30 degrees. P1 is perpendicular to a typical user axis U. Such angles can be based on a body type, physiology and/or biomechanics of an average user. As such, positioning the left section 102 at such an angle can reduce the strain on the left wrist for that user. In other embodiments, the left section 102 can be angled with the first angle between about 23 and about 27 degrees from perpendicular, at about 25 degrees from perpendicular, between about 15 and about 20 degrees from perpendicular, between about 30 and about 35 degrees from perpendicular and/or at any other suitable angle to reduce the strain on the left wrist for a particular user.

Keys in the left section 102 can include, for example, escape, f1, f2, f3, f4, f5, ', 1, 2, 3, 4, 5, 6, tab, q, w, e, r, t, y, caps lock, a, s, d, f, g, Shift, z, x, c, v, b, control, mod, alt and space. In other embodiments, any other keys can be included in the left section 102.

The keys 110 in the right section 104 of the ergonomic keyboard 100 can be organized in non-staggered columns and/or rows, with some keys occupying more than one row and/or column, and some keys offset. Specifically, the keys 110 of right section 104 can be arranged in a substantially similar manner as the keys in left section 102, described above.

The right section 104 can be angled at a second angle of between about −20 and −30 degrees from perpendicular, which is an angle that limits lateral bending of the right wrist. For example, the second angle can be a negative angle Y in FIG. 1 defined by the intersection of a perpendicular axis P1 and an axis R defined by an edge of the right section 104 of the keyboard 100 can be between about 20 and 30 degrees. Such angles can be adjusted based on a body type, physiology and/or biomechanics of an average user or merely preference. As such, positioning the right section 104 at such an angle can reduce the strain on the right wrist for that user. In other embodiments, the right section 104 has the second angle is between about −23 and about −27 degrees from perpendicular, at about −25 degrees from perpendicular, between about −15 and about −20 degrees from perpendicular, between about −30 and about −35 degrees from perpendicular and/or at any other suitable angle to reduce the strain on the right wrist for a particular user.

Keys in the right section 104 of a traditional keyboard arrangement can include f6, f7, f8, f9, f10, f11, , 7, 8, 9, 0, −, =, backspace, u, i, o, p, [, ], \, h, j, k, l, ;, ', return, n, m, comma, period, /, Shift, space, alt, menu, control. In other embodiments, any other keys can be included in the right section 104.

In various embodiments, the different keys can be located in multiple sections and be sized differently in the different sections. For example, the Shift key and Return key in the right section of the keyboard can occupy two key positions each, oriented so as to span two rows and one column each. See FIG. 5. In other embodiments, these keys may occupy two columns and one row each. In other embodiments they may be alternately sized.

The keys 110 in the supplementary section 106 of the ergonomic keyboard 100 can be organized in non-staggered columns and/or rows, with some keys occupying more than one row and/or column, and some gaps to facilitate navigation of the keys. Specifically, the keys 110 of supplementary section 106 can be arranged in a substantially similar manner as the keys in left section 102, described above.

The supplementary section 106 can be angled at one or more supplementary angles. For example, when the supplementary section 106 is located adjacent to the right section 104, as in FIG. 1 embodiments, the supplementary angle may be between about −5 and −15 degrees from the perpendicular, which is an angle which limits an amount of pivoting of the right wrist to move to the supplementary section from the right section 104. For example, the supplementary angle can be a negative angle Z in FIG. 1 defined by the intersection of a perpendicular axis P2 (parallel to axis P1) and an axis S defined by an edge of the right section 104 of the keyboard 100 is between about 5 and 15 degrees. Such angles can be based on a body type, physiology and/or biomechanics of an average user. As such, positioning the supplementary section 106 at such an angle can reduce the strain on the right wrist for that user when pivoting to move from the right section 104 to the supplementary section 106. In other embodiments, the supplementary section 106 can be angled between about −6 and about −9 degrees from perpendicular, at about −7 degrees from perpendicular, between about −3 and about −5 degrees from perpendicular, between about −15 and about −20 degrees from perpendicular and/or at any other suitable angle to reduce the strain on the right wrist for a particular user when pivoting to move from the right section 104 to the supplementary section 106.

In some embodiments, keys in the supplementary section can include f12, f13, f14, media back, media play/pause, media forward, printscreen, scroll lock, pause, numlock, /, *, −, insert, home, page up, 7, 8, 9, +, delete, end, page down, 4, 5, 6, cursor up, 1, 2, 3, enter, cursor left, cursor down, cursor right, 0, period.

Various embodiments have been described with the supplementary section adjacent to the right section of the keyboard. One of ordinary skill will appreciate that the supplementary section can be located adjacent to the left section, as well as located adjacent to both the left and right sections, see, for example, FIG. 10*a*.

While shown and described above as specific keys being aligned and/or not aligned with other keys, in other embodiments, different keys than shown may be aligned and/or not aligned with other keys. Similarly stated, in other embodiments, any suitable keys can be aligned and/or not aligned with any other suitable keys.

Figure 5:
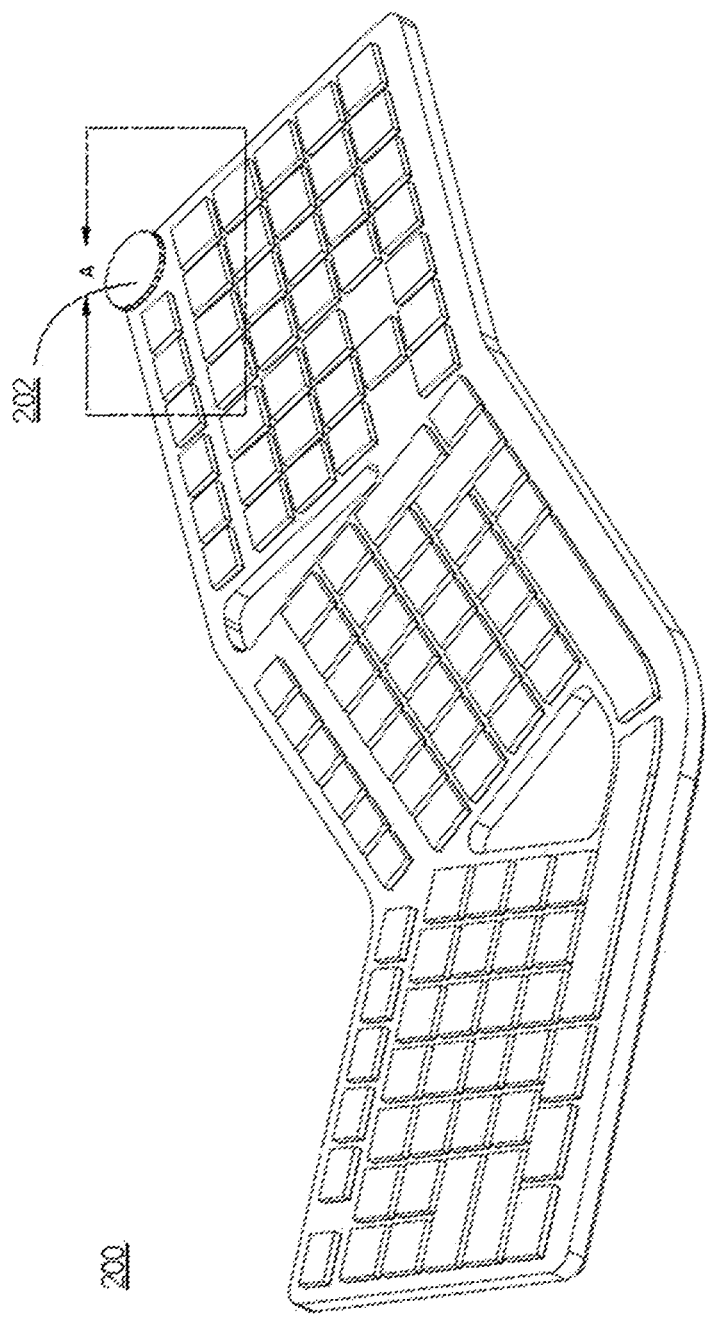
FIG. 5 shows a perspective view of other ergonomic keyboard embodiments.
Figure 6:
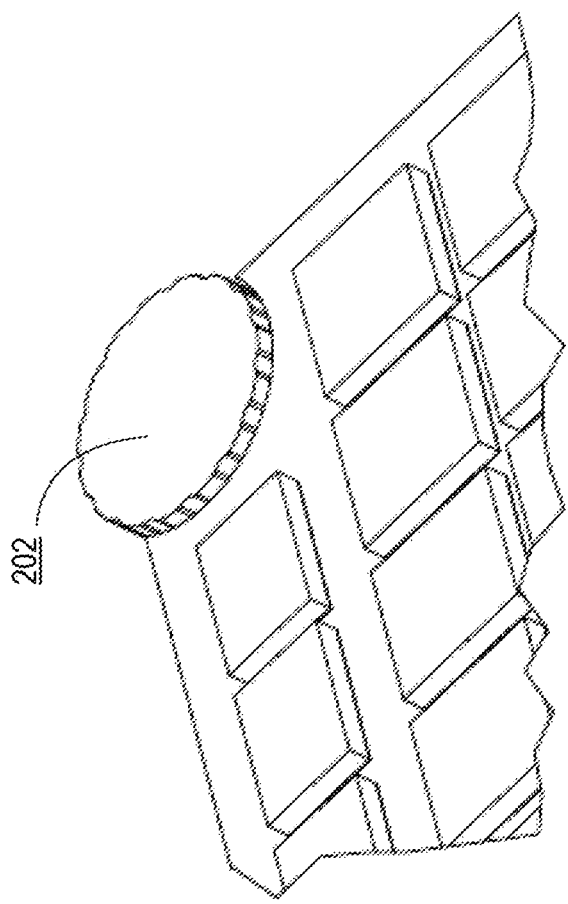
FIG. 6 shows a detailed perspective view of a circular key for use in various ergonomic keyboard embodiments of FIG. 5.

In some embodiments, a keyboard can include a control dial (or circular key) that can be rotated, slid, and/or pressed. For example, FIGS. 5-6 illustrate an ergonomic keyboard 200 functionally and structurally similar to ergonomic keyboard 100 (shown in FIGS. 1-4) but having a circular key 202. In some embodiments, upon rotation A of a certain number of degrees, the circular key 202 can be configured to send a signal to the compute device (not shown) to increase or decrease a volume of a media or perform other functions when rotated clockwise and counterclockwise. For example, if the circular key 202 is rotated in a clockwise direction, the volume of the media can decrease and if the circular key 202 is rotated in a counterclockwise direction, the volume of the media can increase. In other embodiments, a clockwise direction is used to increase the volume and a counterclockwise direction is used to decrease the volume. Pressing the circular key 202 can provide other functions, such as turning a media player on and off, muting sound, turning a display on and off, present various menus, where rotating the key 202 can scroll up and down the menus, etc.

An ergonomic keyboard (FIG. 1, FIG. 4) can, for example, contain sections cut out from the frame of the keyboard, which are lit from underneath so as to provide sufficient backlighting that a user may see to find keys in low light conditions. The keys may be backlit.

The keyboard 100 is generally an input means or device that is part of a system 150 configured for various purposes, e.g., computing, storage, transcription, display, etc., as is known to one of skill in the art. The system 150 can include various devices 140, e.g., processors, memory, storage, etc. that are configured to receive input via wired or wireless connections, as is further known.

Figure 2:
FIG. 2 shows a front view of ergonomic keyboard embodiments of FIG. 1.
Figure 3:
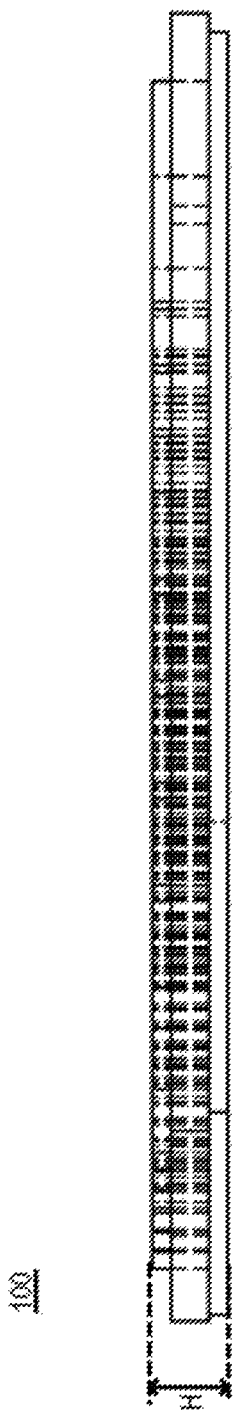
FIG. 3 shows a side view of ergonomic keyboard embodiments of FIG. 1.
Figure 4:
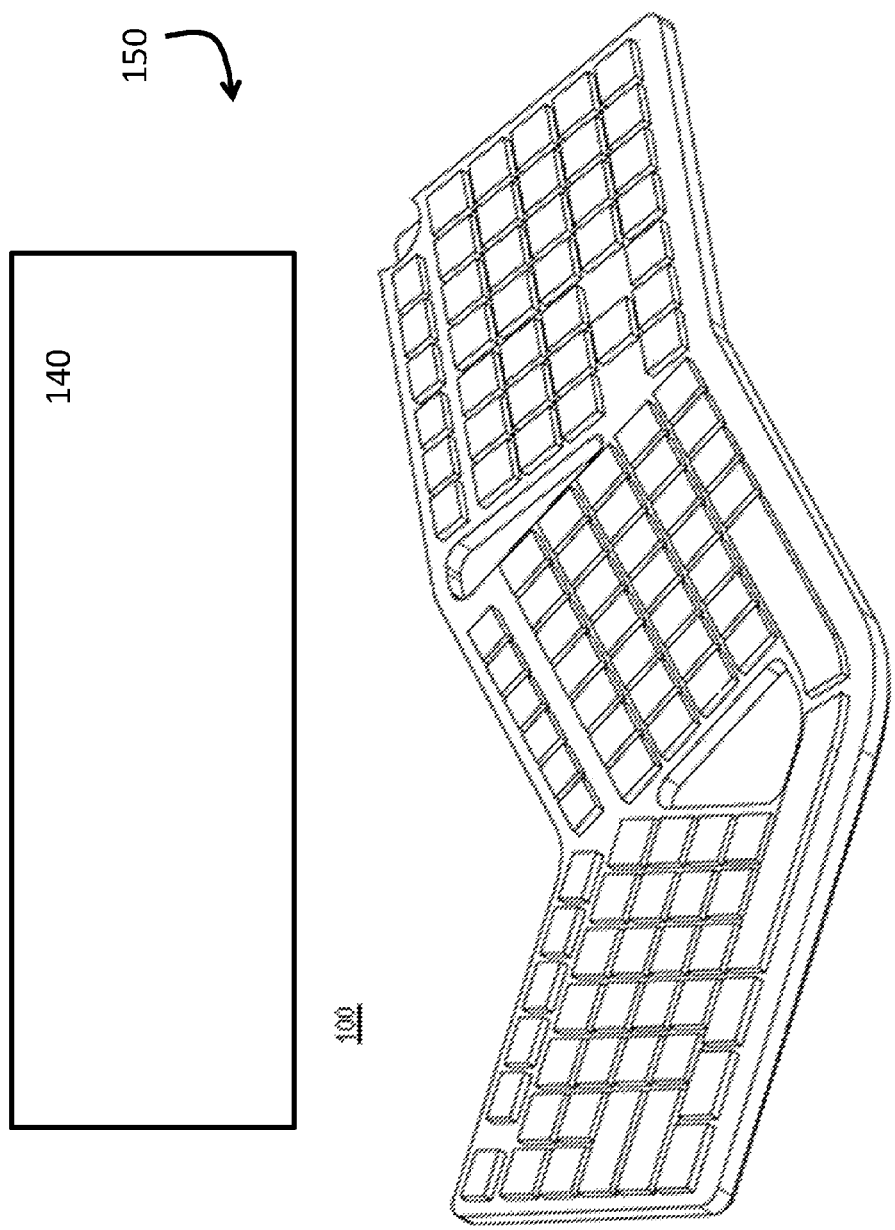
FIG. 4 shows a perspective view of ergonomic keyboard embodiments of FIG. 1 as part of a system.

An ergonomic keyboard can, for example, have a substantially uniform total height H (shown in FIGS. 2 and 3), which may not exceed about 1 centimeter, so as to minimize wrist extension. In other embodiments, the total height of the keyboard from the surface that it sits on may be up to about 2.0 cm. As shown in FIGS. 2 and 3, there may be some difference in total height between the portions of the keyboard with keys and those portions without keys, while each portion is substantially uniform with the top and bottom planes of the keyboard being substantially parallel.

The keyboard can be arranged such that it does not rise in elevation from front/bottom to back/top or from left to right relative to a user position. The front/bottom edge being closest to the typical position of the user of the keyboard. Similarly stated, the face of the keyboard can define a plane that is substantially parallel to a flat surface on which it rests.

In some embodiments, the front/bottom edge of the keyboard will be elevated relative to the back/top edge of the keyboard using traditional means, such as adjustable posts, stands, feet, etc. The elevation of the front/bottom edge place the front/bottom edge higher than the back/top edge of the keyboard, when the keyboard is placed on a flat surface. The elevation allows the hands to drop below the level of wrists in a position that may place less strain on the wrists.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

While described above as being arranged in non-staggered columns and/or rows, in other embodiments, keys may be divided into sections (e.g., left section 102, right section 104 and supplementary section 106) and staggered within those sections. Similarly stated, the two substantially parallel edges of a key associated with that key's position in a column can be positioned non-parallel with the edges of other keys in a column.

In an embodiment of an ergonomic keyboard, keys may be arranged in sections as described above, with the variation that keys are angled at between about 5 and 15 degrees to P1, about −5 and −15 degrees to P1, and about 0-10 degrees to P1.

Although various embodiments have been described as having particular features and/or combinations of components, other embodiments are possible having a combination of any features and/or components from any of embodiments as discussed above. For example, in some embodiments, the keyboard can include less than three sections. For example, in some embodiments the keyboard can include the referred to left and right sections, but not include the supplementary section.

Figure 7:
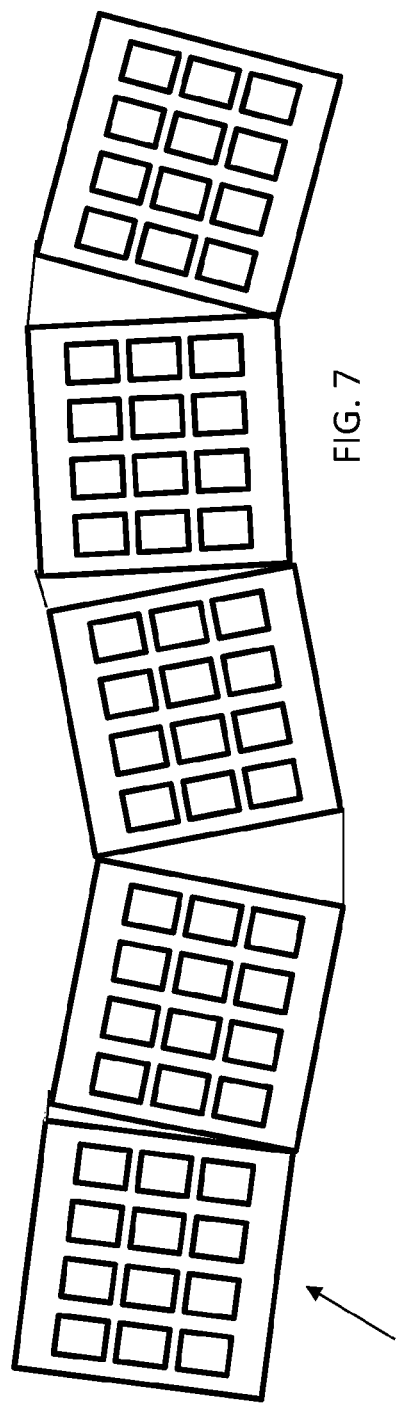
FIG. 7 shows a plan view of ergonomic keyboard embodiments with more than three sections.

In other embodiments, the keyboard can include more than three sections. For example, keyboard embodiments, such as shown in FIG. 7 can include five sections by dividing each of the left section and the right section into two subsections (e.g., first and second left and first and second right). Each subsection can be arranged at different (3rd, 4th, etc.) angles (e.g., to a perpendicular axis) than the other subsections.

As another example, the angles of the sections (e.g., angles X, Y and/or Z shown in FIG. 1) can be variable such that the user can adjust the angles to his or her preference. Specifically, the keyboard can include a hinge and/or other rotating mechanism between the sections that allows a user to vary the angles between the sections. For example, a first rotating mechanism can be included between the left section and the right section and a second rotating section can be included between the right section and the supplementary section. In some embodiments, the rotating mechanisms can include locking members with a locked and unlocked position. When in the locked position, the locking member allows a user to lock and/or fix an angle such that the angle does not change when in use. When in the unlocked position, the user can modify the angle between the sections.

Figure 8:
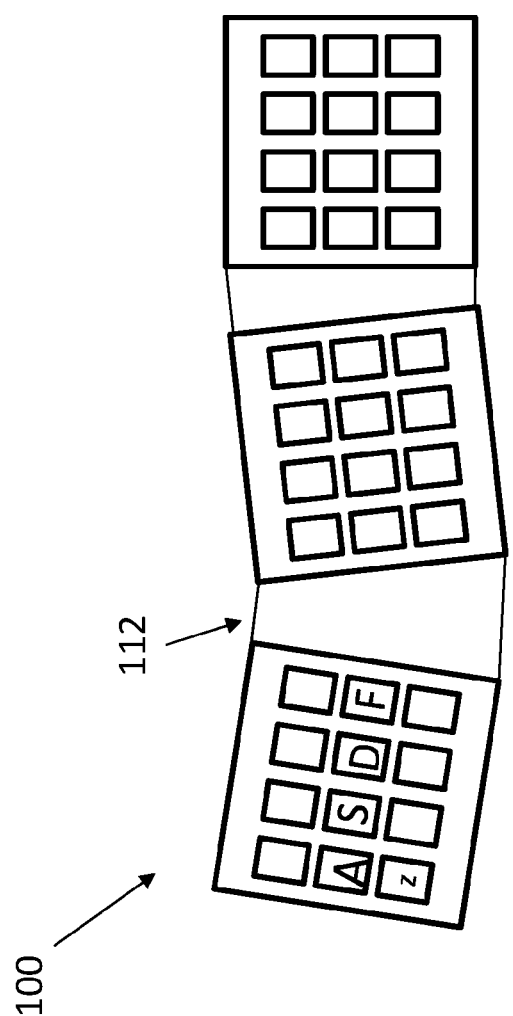
FIG. 8 shows a plan view of ergonomic keyboard embodiments with telescoping members.

In other embodiments, the user can adjust the spacing between the sections. For example, in embodiments such as shown in FIG. 8, the keyboard can include an extendable (e.g., telescoping) member 112 between the sections (i.e., the left section, the right section and/or the supplementary section). In such an embodiment, the user can extend or reduce the extendable member 112 to increase or decrease the space between each section. Such an embodiment allows a user to optimize and/or improve the keyboard spacing for their preference and/or comfort.

While described above as having substantially parallel column and row edges in a uniform grid pattern, in other embodiments, the some or all of the keys can be arranged in a non-staggered, non-uniform grid, as shown in FIG. 9a-c. In such embodiments, the keys can be arranged and/or aligned in substantially linear columns but arranged and/or aligned in curved and/or arched rows. Thus, the keys can be spaced closer together toward a first edge of the keyboard (the edge configured to be closest to a user when in use) than at a second edge of the keyboard opposite the first edge of the keyboard. Similarly stated, the keys in each section can fan out from a first edge to a second edge. Such a curved key arrangement can be used to further limit the amount of lateral bending of the wrists of users.

Figure 10B:
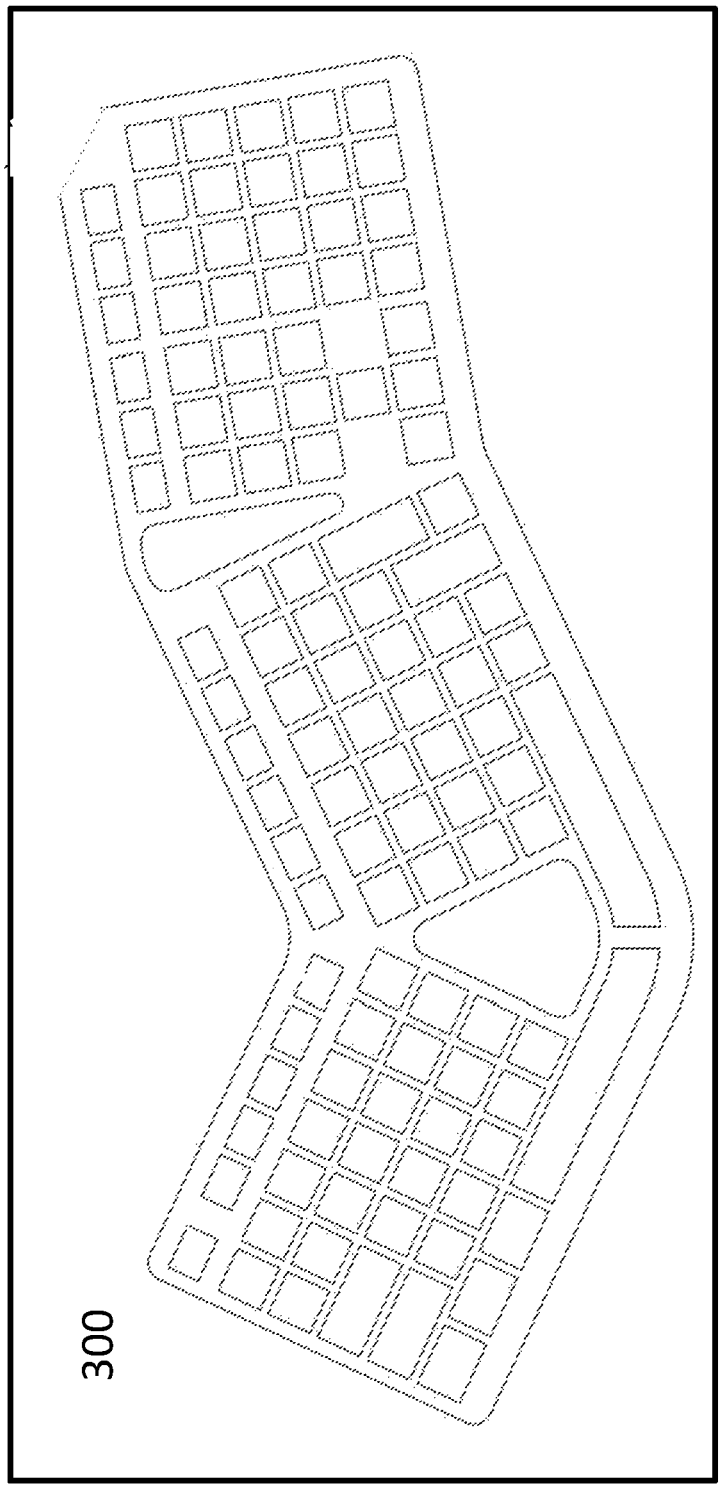
FIGS. 10*a&b* shows a plan view of ergonomic keyboard virtual display embodiments.

While described above as a hardware keyboard, in other embodiments, the keyboard can be a virtual keyboard displayed on a display device 300, as further shown in FIGS. 10a&b, that is separate from or part of the device receiving input from the keyboard. For example, the keyboard can be a virtual representation generated by software (executing in hardware). Such a virtual representation can be displayed, for example, on one or more suitable compute device, such as a tablet, a personal computer, a smart phone and/or the like. The form factor of larger tablets are generally well suited to meet the physical description of keyboards of the present invention.

Virtual keyboard embodiments provide the user with great flexibility in laying the keyboard according to the present invention. Some examples of the variations are as follows.

The keyboard can be broken up into any number of sections desired by the user.

The sections can be arranged in any number of positive and negative angles relative to the perpendicular and those angles can be adjusted statically or dynamically by the user. Statically meaning set by a user and held constant until changed by the user. Dynamically meaning adjusted by the software during use based on factors determined by the user's operation of the keyboard.

The virtual keys can be arranged in combinations of various non-staggered, as well as staggered arrangements.

The virtual keys can be ordered in standard arrangements, such as QWERTY, or in user defined arrangements to accommodate user preferences. For example, function keys F1-F12 can be eliminated, if not used by a user and the remaining keys made larger.

The keys can be made different sizes, e.g., often used writing character keys can be made larger than other writing character keys.

The same alphabet keys can be included in both the left and right sections.

The labels on the keys can be made different characteristics, e.g., sizes, colors, font, etc.

Additional keys can be provided with additional functions, such bold, underline, menu, etc.

Other functionality known with existing virtual keyboards can also be included.

Virtual keyboard devices will generally include one or more touch sensitive displays for displaying the virtual keyboard, one or more processors, storage including computer readable medium for storing software instructions that can be executed by the one more processors, along with the various other components necessary for electronic device operation, such as power and communications inputs and outputs, etc., as is known in the art.

Device and methods of operation of the virtual keyboard will generally include executing instructions via the processor on the device to provide input for the keyboard configuration including inputting the number of sections, angles between the sections, language, any custom arrangement of keys, key sizes and labels, key alignment, custom key functions.

In various virtual keyboard embodiments, the user is requested to place their hands on the display in a comfortable position. The display will determine the locations of contact of the hands on the display and will use the hand location during set up to determine the number of sections and the angles between the sections. For example, the software may consider various factors when laying out the keyboard, such as the size of the hands, left or right handed, finger size, display size, user age, language, etc.

In still other embodiments, the invention includes hybrid physical and virtual keyboard embodiments including both physical and virtual components. For example, some or all of the keys could include display elements, so the function of those keys, as well as the label, can be varied by the user. Further, the keyboard may include separate physical and virtual components, such that some key functions and positions are fixed and others can be varied on the display.

Some embodiments described herein relate to a computer input product with a transitory computer-readable medium (also can be referred to as a transitory processor-readable medium) or non-transitory computer-readable medium having instructions or computer code thereon for performing various computer-implemented operations. The computer-readable medium (or processor-readable medium) may be considered transitory in the sense that it includes transitory propagating signals (e.g., a propagating electromagnetic wave carrying information on a transmission medium such as space or a cable).

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basis™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

These and other variations and modifications of the present invention are possible and contemplated, and it is intended that the foregoing specification and the following claims cover such modifications and variations.

What is claimed is:

1. A keyboard comprising:
   a left section including a left set of keys,
      the left section being arranged at a first angle,
         the first angle being positive relative to a perpendicular to a user axis,
      the left set of keys including a first group of writing character keys in a non-staggered arrangement;
   a right section including a right set of keys,
      the right section being arranged at a second angle, the second angle being negative relative to the perpendicular,
      the right set of keys including a second group of writing character keys in a non-staggered arrangement; and
   at least one supplementary section including a supplementary set of keys,
      the supplementary set of keys being in a non-staggered arrangement,
      the supplementary section being located adjacent to at least one of the left section and the right section,
         the supplementary section being arranged in at least one supplementary angle, and
      the left, right, and supplementary sections arranged to have a total height that is substantially uniform.

2. The keyboard of claim 1, where
   at least one of the left set of keys and the right set of keys are arranged in align columns.

3. The keyboard of claim 1, where
   at least one of the left set of keys, the right set of keys, and the supplementary keys are arranged in rows that are curved.

4. The keyboard of claim 1, where
   at least one of the left set of keys, the right set of keys, and the supplementary keys are arranged in rows that are arched.

5. The keyboard of claim 1, where
   at least one of the left set of keys, the right set of keys, and the supplementary keys are arranged in columns that fan out from row to row.

6. The keyboard of claim 1, further comprising:
   a bottom edge that can elevated to allow at least some of the left keys, the right keys, and supplementary keys closer to the bottom edge to be elevated relative to others of the left keys, the right keys, and supplementary keys.

7. The keyboard of claim 1, where
   at least one of the first angle, the second angle, and the at least one supplementary angle are adjustable.

8. The keyboard of claim 1, where
   the left section comprises at least first left and second left sections.

9. The keyboard of claim 8, where
   the second left section is arranged at a third angle relative to the perpendicular,
   the third angle being less than the first angle.

10. The keyboard of claim 1, where
    the right section comprises at least first right and second right sections.

11. The keyboard of claim 10, where
    the second right section is arranged at a fourth angle relative to the perpendicular,
    the fourth angle being less than negative than the second angle.

12. The keyboard of claim 1, where
    the second angle is between −20 and −30 degrees from the perpendicular;
    the supplementary angle is between −5 and −15 degrees from the perpendicular; and
    the first angle is between 20 and 30 degrees from the perpendicular.

13. The keyboard of claim 1, where
    the first angle is between 23 and 27 degrees from the perpendicular;
    the second angle is between −23 and −27 degrees from the perpendicular; and
    the supplementary angle is between −6 and −9 degrees from the perpendicular.

14. The keyboard of claim 1, where
    the total height is nominally one centimeter or less.

15. The keyboard of claim 1, where
    the total height is nominally two centimeters or less.

16. The keyboard of claim 1, where
    the supplementary section is located adjacent to right section; and
    the supplementary angle is less negative than the second angle.

17. The keyboard of claim 1, where
    at least one of the left, right, and supplementary section are virtual and presented on a display device.

18. The keyboard of claim 1, where
    at least one of the left, right, and supplementary section include keys are reconfigurable.

19. The keyboard of claim 1, where the supplementary section further comprises a control dial configurable to perform at least one function when the control dial is rotated and at least one function when the dial is pressed.

20. A keyboard comprising:
    a left section including a left set of keys,
       the left section being arranged at a first angle between 20 and 30 degrees relative to a perpendicular to a user axis,
       the left set of keys including a first group of letter keys in a QWERTY layout and arranged in linear columns;
    a right section including a right set of keys,
       the right section being arranged at a second angle between −20 and −30 degrees relative to the perpendicular to the user axis,
       the right set of keys including a second group of letter keys in the QWERTY layout not in the first group and arranged in linear columns; and
    a supplementary section including a supplementary set of keys located adjacent to the right section,
       the supplementary set of keys being in being arranged in linear columns,
       the supplementary section being arranged at a supplementary angle between −5 and −15 relative to the perpendicular to the user axis, and
       all of the left, right, and supplementary sections having a substantially uniform total height of 1 centimeter or less.

* * * * *